July 11, 1961

N. TH. HUMMELEN 2,991,948

APPARATUS FOR DISINTEGRATING
REFUSE AND LIKE WASTE MATTER

Filed Feb. 3, 1958

INVENTOR.
NIKLAAS TH. HUMMELEN
BY William J. Fox,
attorney.

July 11, 1961

N. TH. HUMMELEN 2,991,948

APPARATUS FOR DISINTEGRATING
REFUSE AND LIKE WASTE MATTER

Filed Feb. 3, 1958

INVENTOR.
NIKLAAS TH. HUMMELEN

BY *Theodore M. Jablon*

ATTORNEY

United States Patent Office 2,991,948
Patented July 11, 1961

2,991,948
APPARATUS FOR DISINTEGRATING REFUSE
AND LIKE WASTE MATTER
Niklaas Th. Hummelen, Rotterdam, Netherlands, assignor to Dorr-Oliver Incorporated, Stamford, Conn., a corporation of Delaware
Filed Feb. 3, 1958, Ser. No. 713,019
Claims priority, application Great Britain Feb. 8, 1957
12 Claims. (Cl. 241—73)

This invention relates to apparatus for disintegrating refuse and like waste material.

Much refuse, especially garbage refuse, contains vegetable and/or organic matter which can usefully be broken down to small size for composting. Also whether or not the refuse contains any organic matter of fertilizing value, there is a disposal question which necessitates the grading of the matter into coarse and fine fractions. Thus, in the case of domestic and industrial refuse, there will inevitably be materials which can readily be reduced to small size, mixed with less frangible materials which have to be dumped, and it is then convenient to use the finer material for fill and smoothing over the dump.

It is an object of the present invention to provide an apparatus for disintegrating refuse or like waste matter which is of comparatively simple construction and very effective in operation. The apparatus according to the present invention operates by a rasping and generally tearing and scraping action as a result of which there is effected a disintegration of soft and frangible materials to such a degree of smallness that they can be used for fertilizer or fill.

The present invention consists in apparatus for disintegrating refuse or like waste matter comprising a perforated trough-like member which receives the waste matter and through which there extends a paddle mechanism constituted by at least one scroll blade extending longitudinally of the trough-like member and operable with relative rotations as between the paddle mechanism and the interior surface of the trough-like member to impel the waste material over the surface of the trough-like member which is roughened or is provided with inwardly extending projections whereby the waste material is disintegrated by a movement relative to the interior surface of the trough-like member which is a component of movement longitudinally of that surface and movement circumferentially thereof.

The trough-like member is perforated so that such material as has been reduced sufficiently in size by operation of the paddle mechanism can fall through the perforations to be collected underneath the trough-like member. For the purposes of discharging infrangible larger materials which are almost certain to collect in the course of the grinding operation, one or more trap doors will usually be provided at the bottom of the trough.

In order that it may be clearly understood and readily carried into effect, the invention will now be described, by way of example, with reference to the accompanying drawing, which is a side elevation mainly in cross-section illustrating one form of apparatus in accordance with the present invention.

Figure 1:
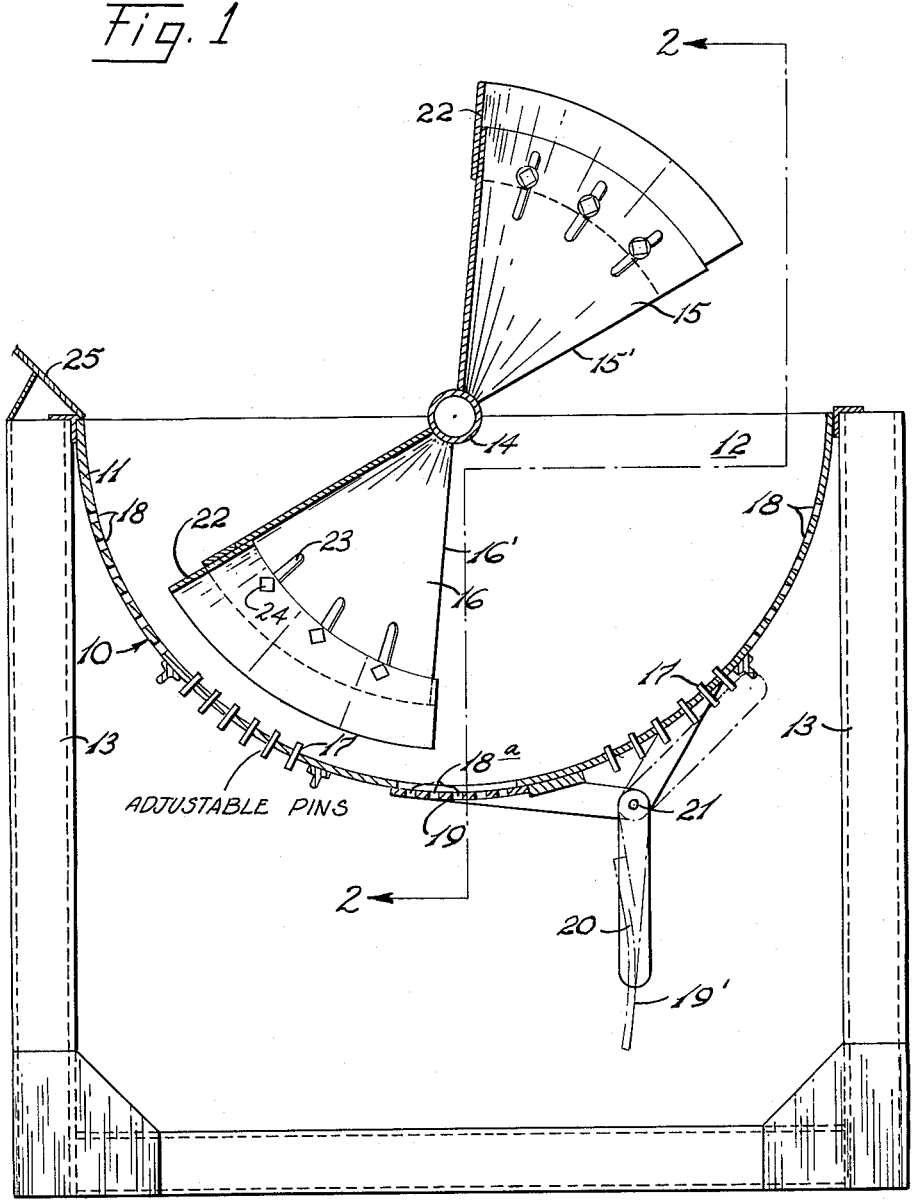
FIG. 1 is a cross-sectional view of the apparatus, illustrating the blade arrangement of the invention relative to the perforations and to the rasping pins provided in the wall of the trough.

In the drawing the reference numeral 10 indicates a trough-like member which receives the matter to be disintegrated. The trough-like member, in the form shown, is defined by an arcuate wall 11 open at the top and closed at its ends by end walls of which the end wall 12 is seen in the drawing. The trough-like member 10 is preferably supported at an elevated position on a framework 13 at such a height that a disposal truck can be moved under the trough-like member for collecting material as it is discharged.

A shaft 14, suitably mounted and driven for rotation, rotates coaxially of the arcuate wall 11 and carries oppositely disposed scroll blades 15 and 16 which so extend from the shaft 14 that the outer edges move through the trough-like member in spaced relationship with respect to the inner surface of the arcuate wall 11. Material in the trough-like member is drawn between scrolls with rotation of the shaft 10 across the inwardly projecting studs or pins 17, as a result of which the material is rubbed, scraped and torn by a sort of rasping action until, in due course, much of it becomes small enough to pass out through perforations or slots as indicated by the reference numerals 18 provided through arcuate wall 11. The perforations or slots are generally interspaced among or alternated with the pins at various stages lengthwise and width-wise of the arcuate wall 11.

In the case of garbage refuse and most industrial waste, it is almost inevitable that material will be encountered which will be sufficiently infrangible that it will not be broken up by the intended disintegrating action. If a build-up of such infrangible matter is to be avoided, it is necessary that it be periodically removed, and for that purpose a trap door 19 is provided at the bottom of the trough-like member. In the form shown, the trap door 19, is shown to have perforations or slots 18a which may be similar to those indicated at 18 in the wall of the trough. The trap door can extend the full length at the bottom of the trough-like member, is supported on a framework which includes, at least at one end, a lever 20 which can be swung about the pivot 21. Preferably, levers are provided, one at each end of the trough-like member, so that not only are they readily accessible, but also their connecting structure will brace the trough-like member longitudinally and provide an effective support for the trap door.

In operation the lever can be actuated to swing the door from the full line position to the dotted line position as clearly seen in the drawing so that a discharge opening is left in the bottom of the trough. In many cases it may be preferred to provide more than one trap door.

Figure 2:
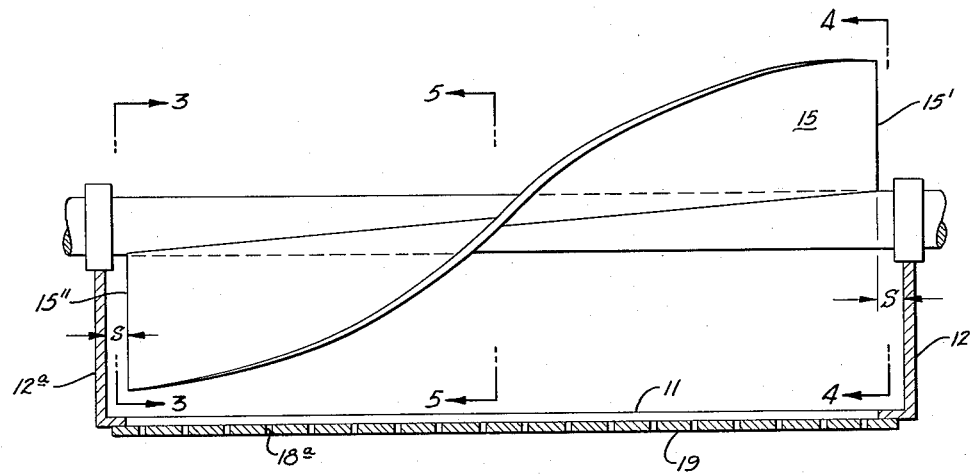
FIG. 2 is a longitudinal sectional view of the apparatus taken on line 2—2 in FIG. 1, illustrating the spaced relationship between the ends of the scroll blades and the respective end walls of the trough.
Figure 3:
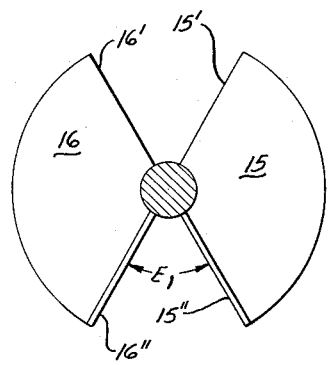
FIG. 3 is a partial cross-section taken on line 3—3 in FIG. 2, showing the terminal edges of the scroll blades and the enclosed angle, at one end.
Figure 4:
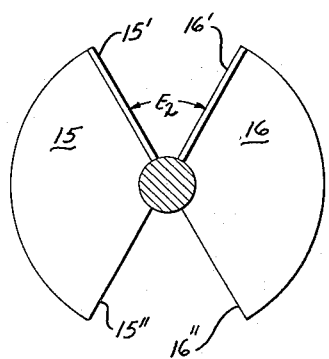
FIG. 4 is a similar partial cross-section taken on line 4—4 in FIG. 2, showing the terminal edges of the scroll blades and the enclosed angle at the opposite end.
Figure 5:
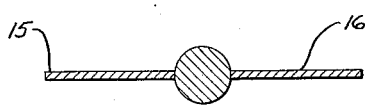
FIG. 5 is a cross-section of the blade arrangement taken on line 5—5 in FIG. 2.

There are several features in regard to the scroll blades which are considered to be of importance. In the form of the apparatus shown in the drawing, two scroll blades 15 and 16 are provided in substantially diametrically opposed spaced relationship and the scroll form of the two blades is pitched of opposite hand. The arrangement is thus such that when the shaft rotates the scroll blades, on encountering the matter in the trough-like member, move it not only circumferentially, but also longitudinally along the trough. This results in an improved rasping operation which is a component of both circumferential and longitudinal movement of the material in the trough. It is also important that the scroll blades shall be in longitudinally staggered relationship. In other words, assuming counter-clockwise rotation of the paddle mechanism as viewed in the drawing, the blade 15, when it enters the trough-like member, will move the material which it encounters circumferentially counter-clockwise and at the same time with a lengthwise component of movement toward the end wall 12. Referring more particularly to FIGURES 2, 3, 4 (wherein the showing of the adjustable edge strips or wear strips 22 has been omitted) it is, therefore, important that what may be termed the leading end 15" of the scroll blade 15 should be disposed adjacent what would in the drawing be the front wall 12a opposite the rear wall 12, and what may be termed the trailing end, as indicated at 15', should terminate in spaced relationship with respect to the end wall 12. This is because, as the material is moved toward the end wall 12 by the scroll blade 15, it would eventually reach a point where it would otherwise go no farther longitudinally. However, if the trailing end 15' of the scroll blade 15 is spaced from the end wall 12, build-up of material at the trailing end will be avoided because, when it gets to the trailing end 15' the material will cascade around the trailing edge 15' through the clearance "s" and will then be caught up and manipulated by the reverse pitched opposite blade 16 which is so longitudinally staggered relative to the scroll blade 15 that its leading end 16' is adjacent the wall 12 whereas its trailing end 16" is spaced from the opposite end wall 12a. By means of this arrangement it is ensured that the material is propelled along with its component of longitudinal and circumferential movement until it is cascaded around the trailing end of one blade, whereafter it is caught up by the oppositely pitched blade and then moved back again in the reverse direction which is likewise a component of longitudinal and circumferential movement.

It is preferable that provision shall be made for adjusting the radial extent of the scroll blades and/or the inward projection of the studs or pins 17. In that respect provision may be made for moving the studs or pins 17 inwardly and also the scroll blades are preferably provided, as shown in the drawing, with detachable and/or adjustable edge strips 22 which are preferably of hard, wear-resistant material. As indicated diagrammatically in the drawing and, by way of example, the scroll blades are provided with radially extending slots 23 through which bolts 24 pass for detachably and adjustably securing the edge strips 22. Although, as shown in the drawing, the paddle mechanism comprises only two blades, it will be appreciated that any number of blades can be provided, but it is important that scroll blades shall be oppositely pitched and in oppositely staggered longitudinal relationship.

From FIGURE 3 it will be seen that the terminal edges 16" and 15" of the scroll blades 15 and 16 adjacent to the wall 12a define an enclosed angle $E_1$, whereas in FIG. 4 the opposite terminal edges 15' and 16' adjacent to the wall 12 constitute an enclosed angle $E_2$ directed opposite to the angle $E_1$.

Generally, the apparatus as shown will be housed in a shed or provided with a cover, and at one or both sides a guide chute may be provided as indicated by the reference numeral 25.

In some instances, especially, for example, where the material to be disintegrated is likely to produce a dust hazard, the top of the trough-like member can be provided with a hinged semi-circular cover.

It will be appreciated that with the construction according to the present invention, the utilization of the scroll blade is important for a number of reasons; for example, because the material in treatment travels with components of movement in more than one direction, the possibility of the machine being clogged by material being stuck between the edge of the scroll blade and the surface of the trough is minimized. By the same token, the pins 17 are fully utilized and tend to be worn evenly and are less likely to become permanently bent than was the case in prior art constructions in which the pins were required to oppose a continous uni-directional load.

I claim:

1. Apparatus for disintegrating refuse or similar waste matter comprising in combination, a trough structure of semi-circular cross-section having perforations as well as inward projections constituting rasping means in the form of pins and having end walls defining the length of the trough; and a rotary disintegrator blade construction comprising a shaft member turnably mounted on said trough longitudinally co-extensive therewith, disintegrator blade means fixed to said shaft member pitched at an angle to the axis thereof, said blade means having peripheral working edge means cooperative with the rasping means in both directions and so constructed and arranged that by the rotational movement of said shaft member said edge means become effective to move the material towards one end of the trough and thereupon towards the opposite end of the trough over said rasping means and perforations whereby the material is disintegrated by the cooperation of the blade means with the rasping means and disintegrated material discharges through said perforations providing uniform wear from both directions of the rasping pins as well as self-cleaning of the pins.

2. The apparatus according to claim 1, wherein the extreme ends of the respective blade means are defined by radial edges spaced from the respective end walls of the trough to provide clearances to allow cascading therethrough of material around those edges to the opposite side of the respective blade means for return movement by the other blade means.

3. Apparatus for disintegrating refuse, garbage or similar waste matter comprising in combination, a trough structure of semi-circular cross-section the curve portion of the trough having perforations as well as inwardly projecting rasping means, and having end walls defining the length of the trough; and a rotary disintegrator blade construction comprising a shaft member mounted for rotation on said trough longitudinally co-extensive therewith, first disintegrator blade means fixed to said shaft member pitched at an angle to the axis thereof, second blade means fixed to said shaft peripherally spaced and separate from said first blade means and pitched in the opposite direction, and arranged transversely opposite to the first blade means substantially along the length thereof, so that rotational movement of said shaft member will cause both blade means to co-operate with each other to move the material back and forth respectively so that the material is moved by the first blade means towards one end of the trough and thereupon towards the opposite end of the trough over said rasping means and perforations whereby the material is disintegrated by the blade means cooperating with the rasping means and disintegrated material discharges through said perforations.

4. The apparatus according to claim 3, wherein said rasping means comprise rasping pins extending substantially radially with respect to the axis of said shaft member.

5. The apparatus according to claim 3, wherein said rasping means comprise rasping pins extending substantially radially with respect to the axis of said shaft member and are radially adjustable, and wherein said rasping pins and the peripheral edge portions of said blade means are adjustable radially relative to each other whereby the clearance between them is variable.

6. The apparatus according to claim 3, wherein said rasping means comprise rasping pins extending substantially radially with respect to said shaft member, and wherein said pins and the perforations respectively are arranged in respective parallel extending banks.

7. The apparatus according to claim 3, wherein said trough has a bottom discharge opening for non-disintegrated residual matter, and a trap door for said opening mounted at the bottom for movement between open and closed position and having perforations for discharge of disintegrated matter.

8. The apparatus according to claim 3, wherein said trough has a longitudinal bottom opening for discharging non-disintegrated residual matter, and a hinged trap door for said opening mounted at the bottom for swingable movement between open and closed position and having perforations for discharging disintegrated matter.

9. The apparatus according to claim 3, wherein said rasping means comprise pins extending substantially radially with respect to said shaft member, wherein said pins and the perforations respectively are arranged in respective banks along the semi-circular cross-section of the trough alternating with one another, wherein further said trough has a longitudinal bottom opening for discharging non-disintegrated residual matter, and a hinged trap door for said opening mounted for operation between open and closed position and having a bank of perforations for discharging disintegrated matter, and wherein said bank of perforations is arranged between banks of rasping pins mounted in the curved portion of the trough.

10. The apparatus according to claim 3, wherein the extreme ends of the respective blade means are defined by radial edges spaced from the respective end walls of the trough to provide clearances to allow cascading therethrough of material around those edges to the opposite side of the respective blade means for return movement by the other blade means.

11. Apparatus for disintegrating refuse or similar waste material comprising in combination, a trough structure in semi-circular cross-section and having end walls defining the length of the trough, the curved portion of the trough having perforations as well as inwardly projecting rasping means; and a rotary disintegrator blade construction comprising a shaft member mounted for rotation on said trough longitudinally co-extensive therewith, first blade means fixed to said shaft member and arranged substantially at a steep spiral pitch, a second substantially similar blade means fixed to said shaft peripherally spaced and separate from said first blade means and arranged substantially symmetrically transversely opposite thereto and substantially along the length thereof with the second blade means pitched in a direction opposite to the pitch of the first blade means, whereby when said shaft member is rotated the radial leading terminal edge of the one blade means is associated with the radial trailing terminal edge of the other blade means, said terminal edges constituting with each other an enclosed angle when viewed from the adjacent end wall of the trough, while the respective opposite leading and trailing terminal edges of the respective blade means constitute an enclosed angle adjacent to the opposite end wall of the trough and oriented radially opposite to said first mentioned enclosed angle, so that with continued rotation of said shaft member said material in the trough is impelled alternatingly in opposite directions by the respective blade means, whereby said material is moved back and forth over said rasping means and said perforations to effect disintegration while disintegrated material discharges from the trough to said perforations.

12. The apparatus according to claim 11, wherein said rasping means are in the form of pins oriented radially with respect to the axis of the shaft, and wherein the extreme ends of the respective blade means are defined by radial edges spaced from the respective ends of the trough to provide clearances to allow cascading therethrough of material around those edges to the opposite side of the respective blade means for return movement by the other blade means.

References Cited in the file of this patent

UNITED STATES PATENTS

| | | |
|---|---|---|
| 24,104 | Davis | May 24, 1859 |
| 105,659 | Ebaugh | July 26, 1870 |
| 152,609 | Craig | June 30, 1874 |
| 315,997 | Beardslee | Apr. 21, 1885 |
| 319,809 | Gathmann | June 9, 1885 |
| 683,256 | Druitt | Sept. 24, 1901 |
| 699,762 | MacDonald | May 13, 1902 |
| 969,998 | Tompkins | Sept. 13, 1910 |
| 978,034 | Kinsey | Dec. 6, 1910 |
| 1,025,480 | Pack | May 7, 1912 |
| 1,660,221 | Dimm | Feb. 21, 1928 |
| 1,669,686 | Worthington | May 15, 1928 |
| 2,145,728 | Mankoff | Jan. 13, 1939 |
| 2,684,785 | Waldorf et al. | July 27, 1954 |

FOREIGN PATENTS

| | | |
|---|---|---|
| 539,524 | Great Britain | Sept. 15, 1941 |